United States Patent Office 3,010,874
Patented Nov. 28, 1961

3,010,874
METHODS OF PREPARATION OF PROTEOLYSATE PRODUCTS
Maurice Roux, 28 Quai Rossignol, Melun, France
No Drawing. Filed Oct. 16, 1957, Ser. No. 690,421
Claims priority, application France Mar. 20, 1957
5 Claims. (Cl. 167—74)

The present invention relates to methods of preparation of proteolysate products from organs of animals and in particular from lymphatic ganglions, for instancs of ox, sheep and other animals.

Such products are intended to be used as anti-spasmodic remedies in gastro-enterology and urology. They have a cholecystokinetic action on the digestive apparatus and give very good results in cases of spasmodic colitis. The epigastric pains which accompany ulcers are calmed by said products. On the urinary apparatus, these products also have a very interesting action in all affections involving contractions of non-striated muscles.

The object of my invention is to provide a method of preparation of such products which is better adapted to meet the requirements of practice than those used at the present time, especially from the point of view of purity.

According to my invention, I subject the starting material which is obtained from organs of animals, and in particular from glandular substances, to the action of an enzymatic solution the temperature and pH of which are variable according to the enzyme that is chosen; then the whole is boiled and filtered, after which it is treated by an alcohol or similar substance to produce a precipitate which constitutes the desired product.

The starting materials are constituted by glandular or other organs of animals, and in particular mesenteric ganglions of ox or sheep, and it is desired to treat them so as to obtain proteolysates and in particular to extract therefrom spasmolytic and vasodilator substances.

Ganglions such as above stated are collected immediately after slaughtering of the animals. They are suitably separated from the annexed tissues and fats, after which they are immediately immersed into cooled acetone and they are quickly frozen.

They are quickly conveyed to the treatment laboratory, where the acetone is eliminated if necessary, and the ganglions are crushed so as to obtain a pulp capable of being treated.

One kilogram of this pulp is diluted with two liters of water and the whole is heated to a temperature averaging 60° C. When this temperature is reached, the pH is checked up to make sure that it is close to 7.

An enzymatic solution is prepared, for instance from papain, this solution containing for instance 10 grams of papain per 100 cubic centimeters of water.

This solution is poured into the glandular suspension made as above stated and it is allowed to act for 15 minutes at 60°, after which the whole is heated to boiling temperature. A temperature of 100° C. is maintained for 10 minutes and the product is filtered on a filter-cloth.

A volume of alcohol at 90° equal to that of the filtered liquor is then added thereto. The whole is left for one night in a refrigerator and the voluminous precipitate that has deposited is eliminated. This first alcohol precipitate generally contains various proteins which have not undergone enzymatic degradation and which could have a sensitizing action after intra-muscular injection.

Finally, the remainder is filtered on a paper and by addition of seven volumes of cooled absolute alcohol, a precipitate is obtained which constitutes the desired product, that is to say the polypeptide.

This last mentioned precipitate, after decantation in a refrigerator, is washed with absolute alcohol, then with anhydrous ether and finally dried under vacuum at low temperature.

Finally, I obtain about 50 grams of a raw hydrolysate containing the above mentioned polypeptide, a substance which has been found experimentally to have useful spasmolytic and vasodilator properties.

It should be noted that a similar process, leading also to the obtainment of hydrolysates of the same kind, may be applied to the treatment of organs of animals other than the above mentioned ganglions and in particular to:

Ox organs such as thyroid, jejunum, heart, spleen, kidney, duodenum, ileum, and liver, Pig organs such as pyloric antrum, stomach, pancreas, ileum and duodenum, and Other organs such as calf thymus, and uterus and placenta of bovidae.

However, it was found that hydrolysates prepared from ganglions were the most active.

In order to measure the spasmolytic activity of the product, I may use the following method:

Rats weighing from 150 to 200 grams are stunned and bled by cutting their carotid, tthen about 10 centimeters of the duodenum of these animals are immediately collected and the intestine is immersed in a tyrode solution (a solution serving to keep the leaving organs in survival state and containing, for instance, per liter of distilled water: 8 grams of sodium chloride, 0.2 gram of potassium chloride, 0.2 gram of crsytalline calcium chloride, 0.1 gram of magnesium chloride, 1 gram of sodium bicarbonate and 1 gram of glucose). A fragment of duodenum approximately 2.5 centimeters long is fixed in an insulated vessel containing the aerated tyrode solution. The temperature of the water bath is kept at 38° C. Once the intestine fragment has slackened, one milligram of baryum chloride is added to the bath, after which an amount of polypeptide producing semi-relaxation of the spasm is added by successive additions.

The biologic unit that is suggested for polypeptide is the amount, per cubic centimeter of tyrode, of said polypeptide capable of producing semi-relaxation of the spasm produced on a fragment of rat duodenum by 0.10 milligram of baryum chloride.

This method of measurement permits of determining the improvement obtained in the activity of the spasmolytic product by various purification methods which will now be described and which advantageously complete the invention.

A first method consists in making use of dialysis. This dialysis is effected for instance through the product designated under the trademark "Cellophane" against distilled water.

Dialysis is carried out at a temperature of +4° C. and maintained for 48 hours under toluene. The product obtained by such dialysis, after concentration under vacuum at low temperature, is five times more active than the raw polypeptide.

According to another method, I operate by solubilization in acetic acid.

The raw polypeptide is treated by glacial acetic acid and the insoluble portion is eliminated by centrifugation. The liquid above said insoluble portion is decanted, then treated with eight volumes of anhydrous ether. The precipitate that is collected after centrifugation is washed with ether and the acetic acid is eliminated by heating under vacuum. I thus obtain a polypeptide which is from three to five times more active.

According to another method, I operate by chromatographic adsorption, for instance on a column of alumina.

Alumina for chromatography is stirred for one hour with normal hydrochloric acid, then washed by means of distilled water until the pH is equal to 6. It is then dried under vacuum at 70° C., then placed in contact with 40° alcohol, after which it is introduced into a column having a diameter of 3 centimeters and a height of 10 centimeters, while avoiding the interposition of air in the column. The column is washed with 40° alcohol after which I proceed to the chromatography of 0.500 gram of raw polypeptide in solution in 100 cubic centimeters of 40° alcohol. The passage is effected slowly by using a vacuum to produce a slight suction.

I eliminate the first 200 cubic centimeters, which do not contain any active substance, and the next 250 cubic centimeters are collected. I thus obtain a polypeptide which is twelve times more active and is quite free from pigments.

According to another method, I operate by partition chromatography on a column of cellulose.

A cellulose powder, without ashes, is placed in suspension in a solvent constituted by a mixture of n-butanol, acetic acid and water with respective percentages of 78, 5 and 17.

This suspension is introduced into a column having a height of 12 centimeters and a diameter of 3 centimeters. By means of a water jet pump, a slight suction is produced and the content of the column is washed for a long time with the solvent. Chromatography is then performed by pouring at the top of the column first a solution of 100 milligrams of raw polypeptide in 0.5 cubic centimeter of water, then the solvent in small amounts.

The first 100 cubic centimeters are eliminated. The active substance is concentrated in the next 60 cubic centimeters which permit of obtaining a polypeptide which is seven times more active.

It should be noted that by simultaneously utilizing the above mentioned purification methods (dialysis followed by a chromatography on alumina, then by a chromatography on cellulose), it is possible to obtain a polypeptide which is eighty two times more active than the raw polypeptide.

The product I obtain has many applications, even outside of the field of remedies.

What I claim is:

1. The method of preparing an anti-spasmodic polypeptide which comprises taking an organ of an animal belonging to the group consisting of mesenteric ganglions of ox and sheep, thyroid, jejunum, heart, spleen, kindey, duodenum, and ileum of ox, pyloric antrum, stomach, pancreas, ileum and duodenum of pig, thymus of calf, and uterus and placenta of bovidae, crushing said organ to a pulp, mixing said pulp with water to form a suspension, mixing this suspension with a solution of papain in water, keeping the mixture thus formed at approximately 60° C. for substantially a quarter of an hour, boiling the whole and filtering, subjecting the liquor thus obtained to the action of alcohol and collecting the precipitate which contains the anti-spasmodic polypeptide.

2. A method according to claim 1 further comprising purifying the precipitate by dialysis.

3. A method according to claim 1 further comprising purifying the precipitate by solubilization in acetic acid and elimination of insoluble impurities.

4. A method according to claim 1 further comprising purifying the precipitate by chromatographic adsorption.

5. A method according to claim 1 further comprising purifying the precipitate by partition chromatography on a cellulose column.

References Cited in the file of this patent

UNITED STATES PATENTS

| | | |
|---|---|---|
| 2,623,001 | Sylven | Dec. 23, 1952 |
| 2,797,184 | Coleman | July 1, 1953 |

OTHER REFERENCES

Skeggs: J. Experimental Med., vol. 104, No. 2, Aug. 1, 1956, pages 193 to 195.